United States Patent Office 3,385,710
Patented May 28, 1968

3,385,710
DISPERSIBLE CHOCOLATE DRINK COMPOSITION AND PROCESS FOR ITS PREPARATION
Dominique Reymond and Theodore Hodel, La Tour-de-Peilz, Switzerland, assignors to Afico S.A., Lausanne, Switzerland, a corporation of Switzerland
No Drawing. Filed June 24, 1964, Ser. No. 377,504
Claims priority, application Switzerland, July 12, 1963, 8,701/63
11 Claims. (Cl. 99—26)

ABSTRACT OF THE DISCLOSURE

A dry, free-flowing composition for the preparation of a chocolate drink comprising agglomerated sugar particles enrobed with chocolate-flavor powder, which may include milk solids. An edible fat is employed to adhere the coating to the sugar particles.

---

This invention is concerned with a chocolate drink composition and with a process for its production.

Chocolate drink mixes, by which term are meant dry mixes which are dispersible in milk or water to give chocolate- or cocoa-flavoured drinks, usually consists of agglomerates of sugar crystals and dry, finely-divided cocoa. Sometimes such mixes also contain whole or skimmed milk solids.

Mixes of this type may be prepared, for example, by agglomerating together the individual ingredients using water, steam or water-vapour as a binding agent. The use of water, however, necessitates a drying step to reduce the moisture content of the product to an acceptable level, and also tends to give a product having an impure colour which is different from that of cocoa powder.

A further disadvantage frequently encountered with some chocolate drink mixes is their poor dispersibility, particularly in cold milk.

The present invention provides a chocolate drink composition consisting of dry, free-flowing granules adapted to be readily dispersible in hot or cold milk or water, in which the granules consist of a sugar core onto which a coating of particles comprising finely divided dry cocoa powder is agglomerated with an edible vegetable fat.

If desired, the particles agglomerated onto the sugar core may also comprise whole or skimmed milk solids so that the composition may be dissolved in water yielding a milky drink.

The edible vegetable fat which is used for agglomerating the cocoa fraction of the composition onto the sugar core is preferably one having a melting point not exceeding 40° C. It is also desirable that the fat should contain not more than 5% of lower fatty acids. Cocoa butter, groundnut oil, sunflower oil and soya-bean oil are examples of preferred fats.

The quantities of sugar and cocoa in the composition are preferably in the weight ratio of about 2 to 1. This ratio, however, may be varied as desired, depending on consumer taste.

The invention also provides a process for the preparation of a chocolate drink composition, which process comprises coating sugar particles with an edible vegetable fat which is in liquid form and subsequently enrobing the fat-coated sugar particles with a powder comprising finely-divided dry cocoa.

Preferably, the sugar particles are first agglomerated so that the finer particles adhere to the coarser ones. This may, for example, be effected by mixing dry sugar crystals (of irregular size) with a small quantity of water or invert sugar syrup. One thus obtains porous agglomerates of sugar particles which have a large surface area.

The sugar agglomerates may then be intimately mixed with, for example, 5–8% by weight of liquid fat, and the fat-coated sugar agglomerates may then be coated with cocoa powder which has preferably first been solubilised.

An inclined pan granulator is advantageously used for the preparation of the chocolate drink composition. According to one preferred embodiment, the pan of the granulator is pre-heated to about 45° C. and is then rotated at 25–30 r.p.m. Sugar, which preferably has been agglomerated as described above, is introduced into the pan and a liquid vegetable fat (e.g., molten cocoa butter, sunflower oil, soya-bean oil or groundnut oil) is then added over several minutes. The quantity of fat to be used should be just sufficient to coat all the sugar. Quantities of fat corresponding to 5–8% by weight of the sugar are quite satisfactory. Lecithin, in quantities amounting to 0.3–0.4% by weight of the sugar may also be added.

When all the fat has been added, the pan is rotated for a short time and cocoa powder, in an amount corresponding to about 60% by weight of the sugar, is then added to the mix. The cocoa powder preferably contains about 15–18% by weight of fat (cocoa butter). Good results may also be obtained by using a solubilised cocoa containing about 20% of cocoa butter.

If desired, milk powder (whole or skimmed) may be mixed with the cocoa powder.

When all the cocoa powder has been introduced, the speed of the pan is reduced to 15–20 r.p.m. and granulation may be continued for another 15 to 30 minutes, the pan being heated for about half the time. Finally, the granulated mass is discharged, at about 45–50° C. Before the pan is discharged, it should be checked that granulation is complete, for example by screening a suitable quantity of the granulate.

The following example is given for the purpose of illustration only.

EXAMPLE

A charge of crystallised sugar, the particles of which have an average diameter of at least 150 microns, and which contains not more than 5% of particles less than 200 microns in diameter, is introduced into a mixer heated to 40° C. and 4% by weight of invert sugar syrup are added thereto. During the mixing, the fine particles stick to the large ones, thus forming agglomerates.

10 kg. of agglomerated sugar is introduced into the pan of an inclined pan granulator. The pan, which had been preheated to 45° C., is rotated at 25–30 r.p.m. A mixture of 0.5–0.7 kg. ground-nut oil and 0.03–0.04 kg. soya lecithin is added during 3–5 minutes. After 5 further minutes, 5.5–6.5 kg. of solubilised cocoa powder, containing approximately 20% cocoa butter are added slowly.

When all the coca powder has been added, the speed of the pan is reduced to 15–20 r.p.m. and gentle heating is maintained for 15–20 minutes. The effect of the heating is to homogenise the mix and to deepen its colour.

The contents of the pan is discharged at 45–50° C. 10–15 minutes after the heating is stopped. The completeness of granulation is checked just before discharging, by screening a sample of the mix on a 500 micron screen.

Finally, the mix is cooled and is ready for packaging, preferably in cans with hermetic closures.

The mix is obtained as dry, free-flowing granules having a bulk density of 0.8. It contains about 11% total fat.

The colour of the mix may be darkened as desired, by heating in the granulator.

10 g. of the granules poured onto the surface of 150 ml. water or 200 ml. milk at 65° C. are wetted and sink in 3 to 6 seconds, respectively.

Subsequent stirring for 5 seconds is sufficient to disperse the mix completely, thus providing a chocolate drink having a pleasant appearance and flavour.

Because of its good wetting and dispersing properties, the mix is especially suitable for use in automatic hot drink dispensing machines.

What is claimed is:

1. A composition for preparing a chocolate drink comprising dry, free-flowing granules readily dispersible in hot and cold liquids, and granules comprising a sugar core and a coating of finely divided dry cocoa powder on said core, said powder being agglomerated to said core by an agglomerant consisting essentially of edible vegetable fat.

2. A composition according to claim 1 wherein said coating includes a member selected from the group consisting of whole milk solids and skimmed milk solids.

3. A composition according to claim 1 wherein the edible vegetable fat is one having a melting point not exceeding 40° C.

4. A composition according to claim 1 wherein the proportion of edible vegetable fat is about 5%–8%, based on the weight of the sugar.

5. A process for preparing a chocolate drink composition in the form of dry, free-flowing granules adapted to be readily dispersible in hot and cold liquids, which comprises coating particles of sugar with an agglomerant consisting essentially of edible vegetable fat in liquid state and enrobing the fat-coated sugar particles with a coating powder comprising finely-divided dry cocoa.

6. A process according to claim 5 wherein the sugar particles are agglomerated before being coated with the vegetable fat.

7. A process for preparing a chocolate drink composition in the form of dry, free-flowing granules adapted to be readily dispersible in hot and cold liquids, which comprises coating particles of sugar with an agglomerant consisting essentially of edible fat in liquid state, said fat being selected from the group consisting of molten cocoa butter, sunflower oil, ground-nut oil and soya-bean oil and enrobing the fat-coated sugar particles with a coating powder comprising finely divided dry cocoa and one member of the class consisting of whole milk solids and skimmed milk solids.

8. A process according to claim 7 wherein the edible fat is added to sugar particles disposed on an inclined rotating pan in an amount just sufficient to coat the sugar particles, and the coating powder is thereafter added to the coated particles while continuing rotation of the pan until granulation is completed.

9. A process according to claim 7, wherein the sugar particles are coated with 5 to 8% by weight of said fat.

10. A process according to claim 9, wherein the sugar is heated to about 45° C. before it is coated with the fat.

11. A process according to claim 9, wherein the weight ratio of sugar to cocoa powder is approximately 2:1.

References Cited

UNITED STATES PATENTS

| 2,850,388 | 9/1958 | Peebles et al. | 99—26 X |
| 3,006,763 | 10/1961 | Marcy et al. | 99—26 |
| 3,028,242 | 4/1962 | Hale et al. | 99—26 |
| 3,053,663 | 9/1962 | Donahue | 99—24 X |
| 3,135,612 | 6/1964 | Hair et al. | 99—94 |
| 3,143,428 | 8/1964 | Reimers et al. | 99—141 |

LIONEL M. SHAPIRO, *Primary Examiner.*

A. LOUIS MONACELL, *Examiner.*

D. M. NAFF, *Assistant Examiner.*

UNITED STATES PATENT OFFICE
CERTIFICATE OF CORRECTION

Patent No. 3,385,710 May 28, 1968

Dominique Reymond et al.

It is certified that error appears in the above identified patent and that said Letters Patent are hereby corrected as shown below:

Column 2, line 72, "to" should read -- and --. Column 3, line 10, "and", second occurrence, should read -- said --.

Signed and sealed this 21st day of October 1969.

(SEAL)
Attest:

Edward M. Fletcher, Jr.  WILLIAM E. SCHUYLER, JR.
Attesting Officer  Commissioner of Patents